(12) United States Patent
Tamura

(10) Patent No.: US 8,970,901 B2
(45) Date of Patent: Mar. 3, 2015

(54) IMAGE PROCESSING APPARATUS, IMAGE DATA TRANSMISSION METHOD, PROGRAM, AND STORAGE MEDIUM

(75) Inventor: Makiya Tamura, Tokyo (JP)

(73) Assignee: Canon Kabushiki Kaisha (JP)

( * ) Notice: Subject to any disclaimer, the term of this patent is extended or adjusted under 35 U.S.C. 154(b) by 533 days.

(21) Appl. No.: 12/618,407

(22) Filed: Nov. 13, 2009

(65) Prior Publication Data

US 2010/0123916 A1    May 20, 2010

(30) Foreign Application Priority Data

Nov. 19, 2008    (JP) ................................ 2008-295465

(51) Int. Cl.
*G06F 15/00*    (2006.01)
*G06F 3/12*    (2006.01)
*G06K 1/00*    (2006.01)
(Continued)

(52) U.S. Cl.
CPC ....... *H04N 1/32101* (2013.01); *H04N 1/00217* (2013.01); *H04N 1/00233* (2013.01); *H04N 1/00214* (2013.01); *H04N 1/00222* (2013.01); *H04N 1/32128* (2013.01); *H04N 2201/3205* (2013.01); *H04N 2201/3209* (2013.01); *H04N 2201/3214* (2013.01); *H04N 2201/3215* (2013.01); *H04N 2201/3278* (2013.01)
USPC ........................... 358/1.9; 358/1.13; 358/1.15

(58) Field of Classification Search
USPC .......... 358/1.9, 1.1, 1.6, 1.13, 1.15, 448, 452, 358/468; 399/81; 715/700, 734, 735, 740, 715/744, 747, 764, 765, 866
See application file for complete search history.

(56) References Cited

U.S. PATENT DOCUMENTS 6,301,611 B1 * 10/2001 Matsumoto et al. .......... 709/217
6,570,667 B1 *  5/2003 Hattori et al. ................ 358/1.15
(Continued)

FOREIGN PATENT DOCUMENTS

JP    2003-134294 A    5/2003
JP    2004-287860 A    10/2004
(Continued)

OTHER PUBLICATIONS

Japanese Office Action for corresponding JP 2008-295465, mail date Jan. 29, 2013.
(Continued)

*Primary Examiner* — Kimberly A Williams
(74) *Attorney, Agent, or Firm* — Rossi, Kimms & McDowell LLP

(57) ABSTRACT

An image processing apparatus that can transmit an image outputted after the execution of a workflow as well as an attribute information file including attribute information suitable for an external system as a transmission destination to the external system. An attribute information management unit manages attributes required by the external system when the image data is transmitted to the external system. A workflow execution unit executes a workflow as a sequential processing in which a plurality of functions of the image processing apparatus are combined. An attribute value setting unit sets attribute values for the attributes required by the external system when the communication unit transmits the image data to the external system. An external system interconnection unit causes the communication unit to transmit the image data output from the workflow execution unit to the external system with reference to the attribute values set by the attribute value setting unit.

7 Claims, 14 Drawing Sheets

(51) Int. Cl.
*H04N 1/32* (2006.01)
*H04N 1/00* (2006.01)

(56) References Cited

U.S. PATENT DOCUMENTS

| | | | | |
|---|---|---|---|---|
| 7,408,658 | B2* | 8/2008 | Twede | 358/1.15 |
| 8,081,344 | B2* | 12/2011 | Miyamoto et al. | 358/1.9 |
| 8,237,937 | B2* | 8/2012 | Sugiyama et al. | 358/1.13 |
| 2003/0103232 | A1* | 6/2003 | Twede | 358/1.15 |
| 2004/0002302 | A1* | 1/2004 | Takemoto et al. | 455/3.06 |
| 2006/0136488 | A1* | 6/2006 | Mifune et al. | 707/102 |
| 2006/0197977 | A1* | 9/2006 | Miyata | 358/1.15 |
| 2011/0063655 | A1* | 3/2011 | Tian | 358/1.15 |

FOREIGN PATENT DOCUMENTS

| | | |
|---|---|---|
| JP | 2005-078448 A | 3/2005 |
| JP | 2006-166100 A | 6/2006 |
| JP | 2007-006020 A | 1/2007 |
| JP | 2007-312335 A | 11/2007 |
| JP | 2008-097586 A | 4/2008 |
| JP | 2008-158940 A | 7/2008 |
| JP | 2008-276574 A | 11/2008 |

OTHER PUBLICATIONS

Japanese Refusal issued in Japanese counterpart application No. JP2008-295465, dated Jul. 30, 2013.

* cited by examiner

FIG.6

ATTRIBUTE INFORMATION MANAGEMENT DB (607)

| ATTRIBUTE ID | CONNECTOR NAME | ATTRIBUTE NAME | ATTRIBUTE INITIAL VALUE | ATTRIBUTE SET VALUE | RELATED ATTRIBUTE ID |
|---|---|---|---|---|---|
| ID001 | SYSTEM A | LOGIN ID | - | | ID003 |
| ID002 | SYSTEM B | DEPARTMENT NAME | FIRST SALES DEPARTMENT | | |
| ID003 | SYSTEM C | USER ID | - | | ID001 |
| ID004 | SYSTEM D | EXTENSION NUMBER | XXX-YYYY | | |
| ... | ... | ... | ... | ... | ... |

ATTRIBUTE DEFINITION FILE

```
900 ─ <?xml version="1.0" encoding="UTF-8" ?>
901 ─ <index>
902 ─    <name>LOGIN ID</name>
         <Connector>SYSTEM A</Connector> ─ 903
         <initialValue> </initialValue> ─ 904
         <relatedIndexId> </relatedIndexId> ─ 905
      </index>
      <index>
         <name> DEPARTMENT NAME </name>
         <Connector>SYSTEM B</Connector>
         <initialValue>FIRST SALES DEPARTMENT</initialValue>
         <relatedIndexId> </relatedIndexId>
      </index>
      ...
      </xml>
```

FIG.11
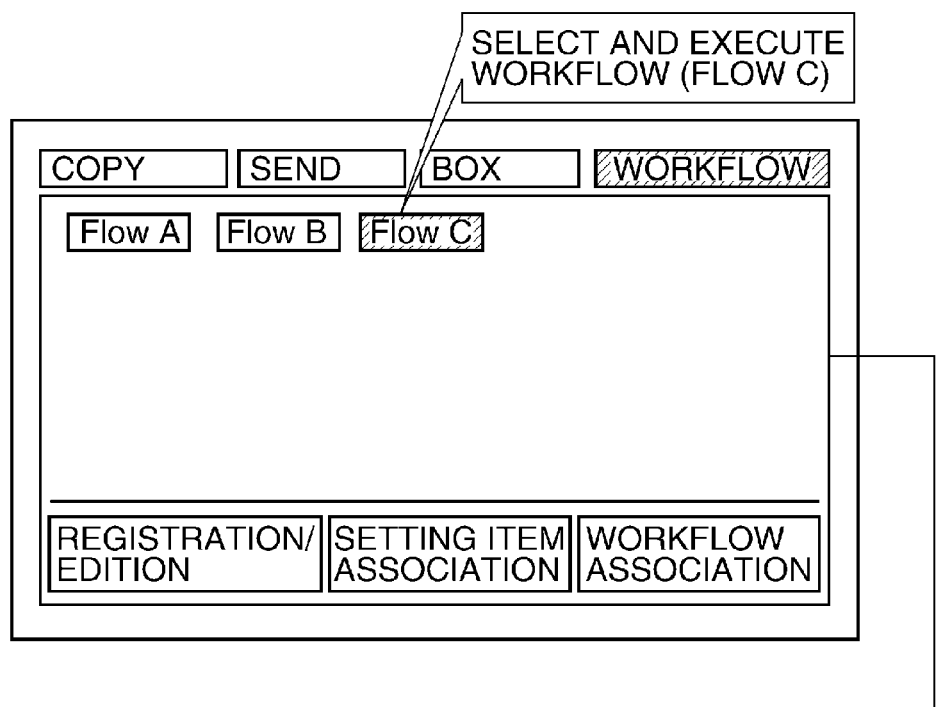
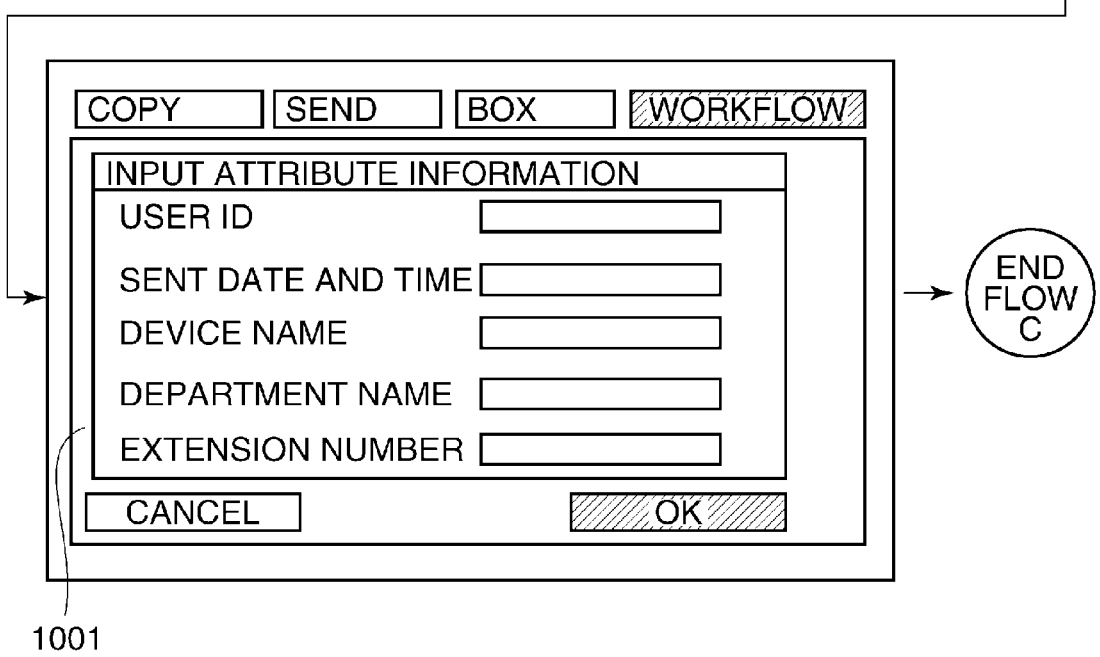

IMAGE PROCESSING APPARATUS, IMAGE DATA TRANSMISSION METHOD, PROGRAM, AND STORAGE MEDIUM

BACKGROUND OF THE INVENTION

1. Field of the Invention

The present invention relates to an image processing apparatus and an image data transmission method that transfer image data to an external system via a network or the like at the time of execution of a workflow, a program for implementing the method, and a storage medium storing the program.

2. Description of the Related Art

In recent years, image processing apparatuses have a network function and are connectable to a network such as a local area network (LAN). This means that image processing apparatuses are connectable to various systems via a network. FIG. 13 shows an exemplary network environment in which an image processing apparatus is connected to various systems via a network.

A reference numeral 100 designates a network, which is an arbitrary network system such as the Internet or an intranet. A reference numeral 101 designates an image processing apparatus, which is connected to the network 100. It should be noted that although in the illustrated example, only one image processing apparatus 101 is connected to the network 100, a plurality of image processing apparatuses 101 may be connected to the network.

Reference numerals 102(1), 102(2), 102(3), and 102(4) designate arbitrary network systems connected to the network 100. It should be noted that although in the illustrated example, four systems are connected to the network, a plurality of systems more than four may be connected to the network. Moreover, for the simplification of explanation, an arbitrary one of the systems is referred to as the system 102(X). Also, one system different from the system 102(X) is referred to as the system 102(Y). Examples of the system 102(X) include an SMB server, an FTP server, an SMTP server, a work system such as an ERP system closely related to actual office work, and a business support system.

A reference numeral 103 designates an information terminal such as a personal computer (PC), which is connected to the network 100. It should be noted that although in the illustrated example, only one information terminal 103 is connected to the network, a plurality of information terminals 103 may be connected to the network.

As described above, the image processing apparatus 101 can be connected to various systems 102(X) via the network 100.

Further, in recent years, the image processing apparatus 101 have various functions of, for example, transmitting generated document data by e-mail and storing generated document data in a data storage area called a box as well as basic functions such as copying and printing. Here, the document data means image data handled in the image processing apparatus, such as image data generated by the image processing apparatus scanning an original, and a received facsimile image.

The functions of the image processing apparatus 101 used for office work such as copying, e-mail transmission, and storage in a box are not only used separately, but also used in combination. For example, there may be a case where "document data generated by scanning an original is stored in a box and transmitted by e-mail to all persons concerned". Also, there may be a case where "a plurality of pieces of data stored in a box are combined into one (combined into one piece of data) and printed."

In such cases, a user has to separately set the individual functions. It is inconvenient for the user to make settings whenever he/she uses the image processing apparatus 101. For this reason, there has been proposed an application that can set each of the individual functions such as copying, e-mail transmission, and storage in a box as one work item, register in advance the order in which a plurality of work items are executed and the contents of settings as to processing on the work items, define the work items as a workflow that can be executed as a sequential processing flow, and execute the workflow. Similarly, there has been proposed a service processing apparatus that controls not only the individual functions of the image processing apparatus 101 but also a plurality of services of the image processing apparatus 101 in cooperation with each other (see, for example, Japanese Laid-Open Patent Publication (Kokai) No. 2004-287860).

Further, there has been proposed a method in which at the time of execution of a work item "Send", an attribute information file storing attribute information related to document data generated by scanning an original is created, and the attribute information file as well as the document data is transmitted (see, for example, Japanese Laid-Open Patent Publication (Kokai) No. 2003-134294).

FIGS. 13 and 14 are views showing how an attribute information file as well as document data generated through scanning by the image processing apparatus 101 is transmitted to the system 102(X) and/or the system 102(Y). As shown in the figures, the attribute information file stores system information such as a name and IP address of the image processing apparatus 101, user information such as a user name of a user who has performed scanning, the name of a department to which the user belongs, and an extension number, and so on. Namely, an attribute information file includes information that is referred to when some processing is performed on document data generated through scanning by another system or program.

However, according to the above prior art, regarding workflows in which document data generated through scanning by the image processing apparatus is transmitted with an attribute information file to the system (X), what attributes should be stored in the attribute information file has to be set in advance for each of the workflows.

In general, an attribute information file includes data (information) that is referred to by a system that processes received document data. For this reason, if an attribute information file does not include attribute values required by a system that processes received document data, it does not make sense.

Moreover, attributes stored in attribute information files differ according to systems that process document data. Namely, attributes to be stored in an attribute information file have to be defined for each workflow. Moreover, as shown in FIG. 14, when a user wants to transmit attribute information files with different contents to the system 102(X) and the system 102(Y), it is not enough for the user to define only one workflow, but the user has to define workflows corresponding in number to the number of systems as transmission destinations. Also, the user has to repeatedly scan the same paper document by executing workflows corresponding in number to the number of attribute information files.

SUMMARY OF THE INVENTION

The present invention provides an image processing apparatus that can transmit an image outputted after the execution of a workflow as well as an attribute information file including attribute information suitable for a system as a transmission destination to the system. Further, the present invention provides an image data transmission method, a program for implementing the method, and a storage medium storing the program.

Accordingly, in a first aspect of the present invention, there is provided an image processing apparatus including an image input unit that inputs image data, and a communication unit that transmits the image data inputted by the image input unit to at least one external system, comprising an attribute information management unit adapted to manage attributes required by the external system when the image data is transmitted to the external system, a workflow execution unit adapted to execute a workflow as a sequential processing in which a plurality of functions of the image processing apparatus are combined, an attribute value setting unit adapted to set attribute values for the attributes required by the external system when the communication unit transmits the image data to the external system, and an external system interconnection unit adapted to cause the communication unit to transmit the image data output from the workflow execution unit to the external system with reference to the attribute values set by the attribute value setting unit.

Accordingly, in a second aspect of the present invention, there is provided an image data transmission method for an image processing apparatus including an image input unit that inputs image data, and a communication unit that transmits the image data inputted by the image input unit to a plurality of external systems, comprising an attribute information management step of managing attributes required by the plurality of external systems when the image data is transmitted to the plurality of external systems, an attribute value setting step of setting attribute values for the attributes required by the plurality of external systems when the communication unit transmits the image data to the plurality of external systems, and an external system interconnection step of causing the communication unit to transmit image data to the plurality of external systems with reference to the attribute values set in the attribute value setting step.

Accordingly, in a third aspect of the present invention, there is provided a program for implementing an image data transmission method for an image processing apparatus including an image input unit that inputs image data, and a communication unit that transmits the image data inputted by the image input unit to a plurality of external systems, the image data transmission method comprising an attribute information management step of managing attributes required by the plurality of external systems when the image data is transmitted to the plurality of external systems, an attribute value setting step of setting attribute values for the attributes required by the plurality of external systems when the communication unit transmits the image data to the plurality of external systems, and an external system interconnection step of causing the communication unit to transmit image data to the plurality of external systems with reference to the attribute values set in the attribute value setting step.

Accordingly, in a fourth aspect of the present invention, there is provided a storage medium readable by a computer storing a program.

According to the present invention, a work load on the user can be reduced as described below. The user can combine workflows into one workflow without the need to define workflows corresponding in number to the number of systems as transmission destinations. Because a plurality of workflows can be combined into one, the user does not have to execute plurality of workflows one by one. The user has only to execute only one workflow.

Further features of the present invention will become apparent from the following description of exemplary embodiments (with reference to the attached drawings).

BRIEF DESCRIPTION OF THE DRAWINGS

FIG. 6 is a view useful in explaining a data structure of an attribute information management DB;

FIG. 7 is a view useful in explaining the contents of an attribute definition file transmitted to an attribute information management unit by the Web browser of the information terminal;

FIG. 11 is a view useful in explaining how screens are changed in the image processing apparatus at the time of execution of a workflow in which document data generated by scanning with an attribute information file attached thereto is transmitted to a system;

DESCRIPTION OF THE EMBODIMENTS

The present invention will now be described in detail with reference to the drawings showing a preferred embodiment thereof.

Figure 1:
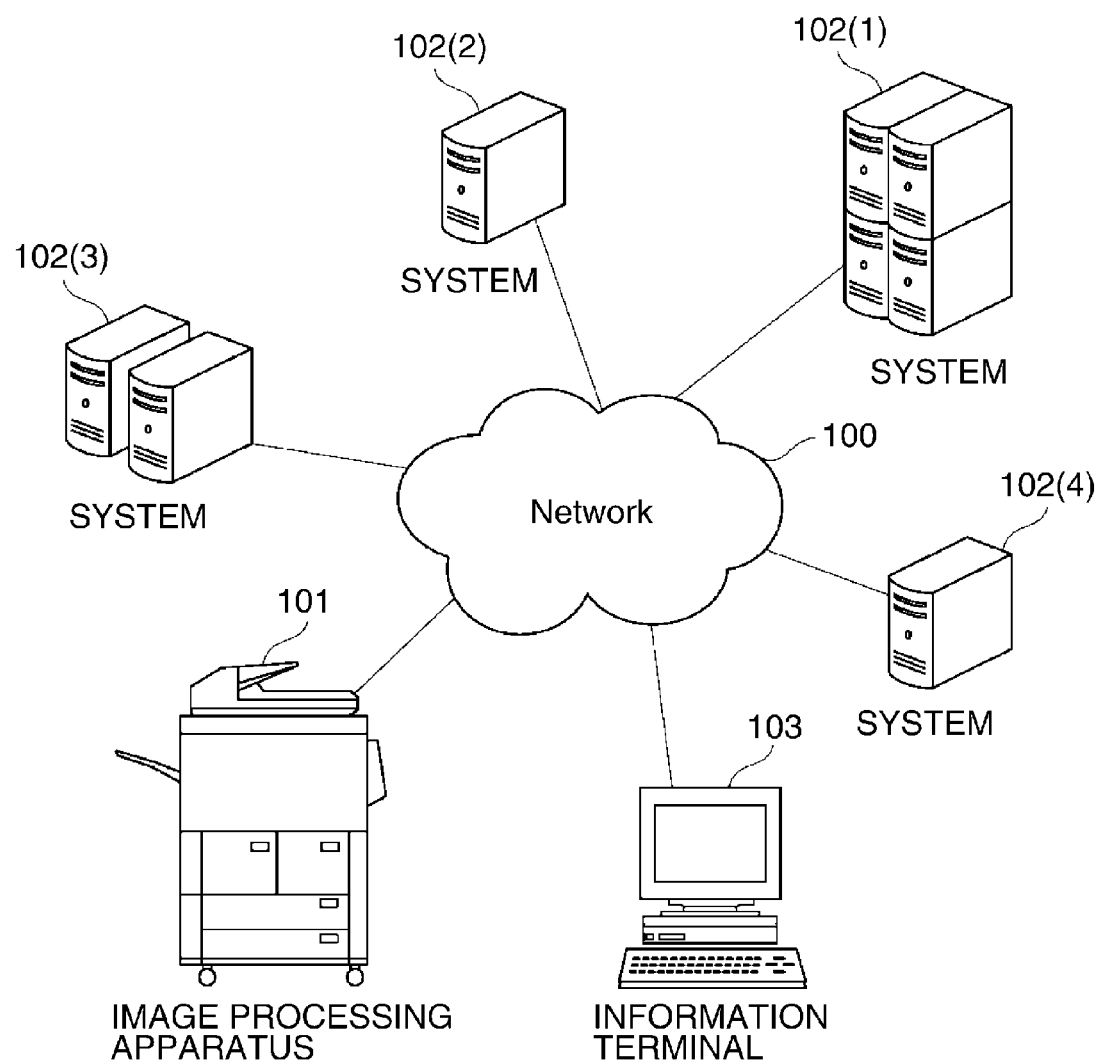
FIG. 1 is a view showing an exemplary network environment in which an image processing apparatus according to an embodiment of the present invention is installed.

FIG. 1 is a view showing an exemplary network environment in which an image processing apparatus according to an embodiment of the present invention is installed.

Referring to FIG. 1, the image processing apparatus 101 is connected to systems 102(1), 102(2), 102(3), and 102(4), and an information terminal 103 such as a personal computer (PC) via a network 100. Although only one image processing apparatus 101 and only one information terminal 103 are illustrated in the figure, there may be a plurality of image processing apparatuses 101 and a plurality of information terminals 103. Similarly, although only four systems 102(1)

to 102(4) are illustrated in the figure, the present invention is not limited to this. The network 100 is assumed to be a network such as the Internet or an intranet, and may be an arbitrary network.

It should be noted that for the simplification of explanation, to indicate an arbitrary one of the plurality of systems 102(1), 102(2), 102(3), 102(4) . . . , it is referred to as the system 102(X). Also, one system different from the system 102(X), it is referred to as the system 102(Y).

It is assumed that the system 102(X) is any one of various systems such as a file server and work systems such as a database system, a document management system, and an ERP system, which are used in an office and the like.

Figure 2:
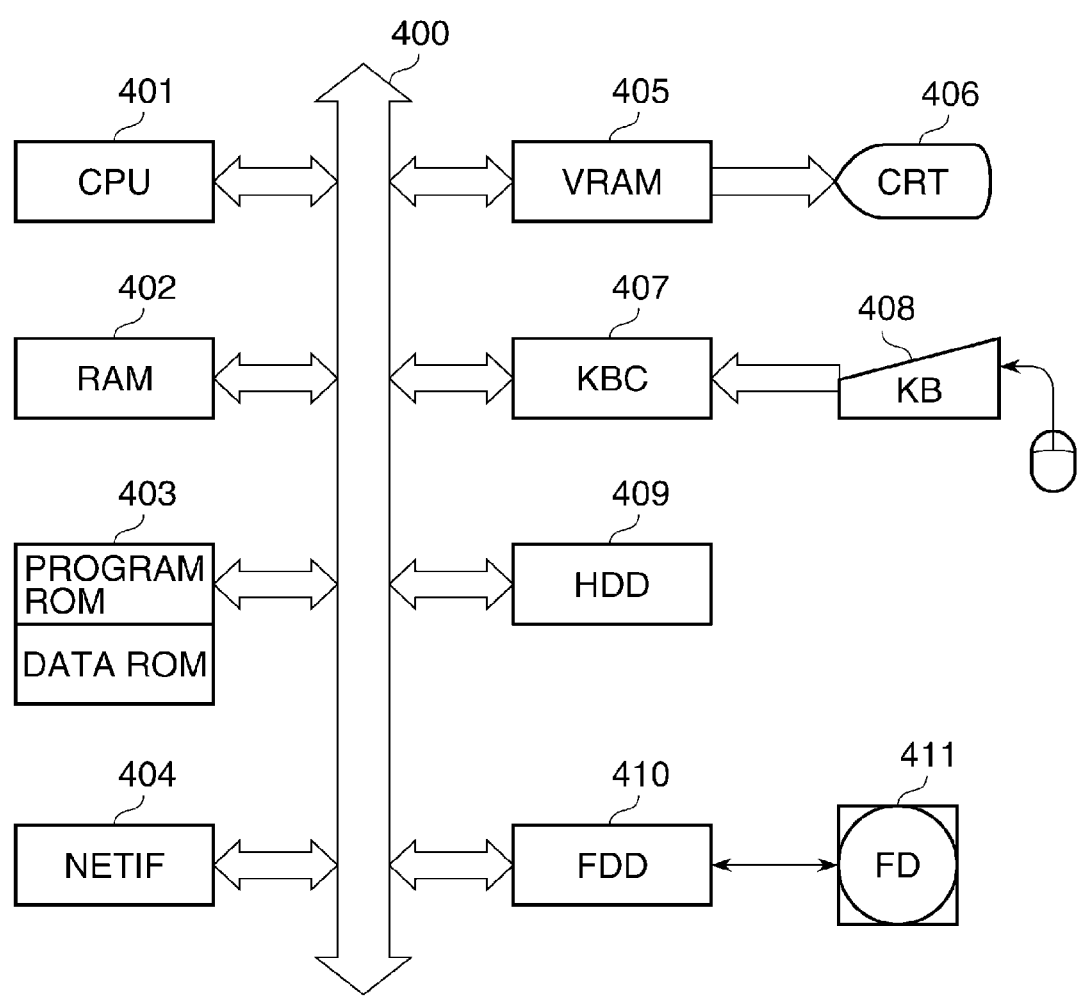
FIG. 2 is a view schematically showing an exemplary arrangement of information processing apparatuses such as systems and an information terminal shown in FIG. 1.

FIG. 2 is a view schematically showing an exemplary arrangement of information processing apparatuses such as the systems 102(X) and the information terminal 103 in FIG. 1.

Referring to FIG. 2, a reference numeral 401 designates a central processing unit (hereinafter referred to as the "CPU") that plays a pivotal role in computing and control of the information processing apparatus. A reference numeral 402 designates a random access memory (hereinafter referred to as the "RAM"), which is a main memory for the CPU 401 and acts as an execution area and a data area for execution programs. A reference numeral 403 designates a read-only memory (hereinafter referred to as the "ROM") that stores control programs to be executed by the CPU 401 and the like. The ROM 403 includes a program ROM in which basic software (OS: operating system) as a system program for controlling the components of the information processing apparatus is recorded, and a data ROM in which information required for operating the system and the like is recorded. Depending on the apparatus type, there may be a case where an HDD 409, described later, is used in place of the ROM 403. A reference numeral 404 designates a network interface (hereinafter referred to as the "NETIF"), which provides control and performs a diagnosis of a connection status so as to transfer data between the information processing apparatuses via the network.

A reference numeral 405 designates a video RAM (hereinafter referred to as the "VRAM"), which expands an image to be displayed on a screen of a CRT 406, described later, which indicates an operational status of the information processing apparatus and controls the display. A reference numeral 406 designates a display unit (hereinafter referred to as the "CRT") such as a display. A reference numeral 407 designates a controller (hereinafter referred to as the "KBC") for controlling input signals from external input devices 408. A reference numeral 408 designates external input devices (hereinafter referred to as the "KB") for receiving operations performed by a user, and they are pointing devices such as a keyboard and a mouse. A reference numeral 409 designates a hard disk drive (hereinafter referred to as the "HDD"), which is used to store application programs and various data. In the present embodiment, examples of the application programs include software programs for executing various kinds of processing.

A reference numeral 410 designates an external input/output device (hereinafter referred to as the "FDD"). The FDD 410 is, for example, a floppy (registered trademark) disk drive or a CD-ROM drive, and used to read the above described application programs from a removal disk such as a floppy (registered trademark) disk or a CD-ROM. A reference numeral 411 designates a removal data recording device (removal medium) (hereinafter referred to as the "FD") such as a magnetic recording medium, an optical recording medium, a magneto-optical recording medium, or a semiconductor recording medium. Examples of the magnetic recording medium include a floppy (registered trademark) disk and an external hard disk. Examples of the optical recording medium include a CD-ROM. Examples of the magneto-optical recording medium include an MO. Examples of the semiconductor recording medium include a memory card. It should be noted that application programs and data stored in the HDD 409 may be stored in the FD 400 and used.

A reference numeral 400 designates transmission buses (address bus, data bus, input/output bus, and control bus) for connecting the above described units together.

Figure 3:
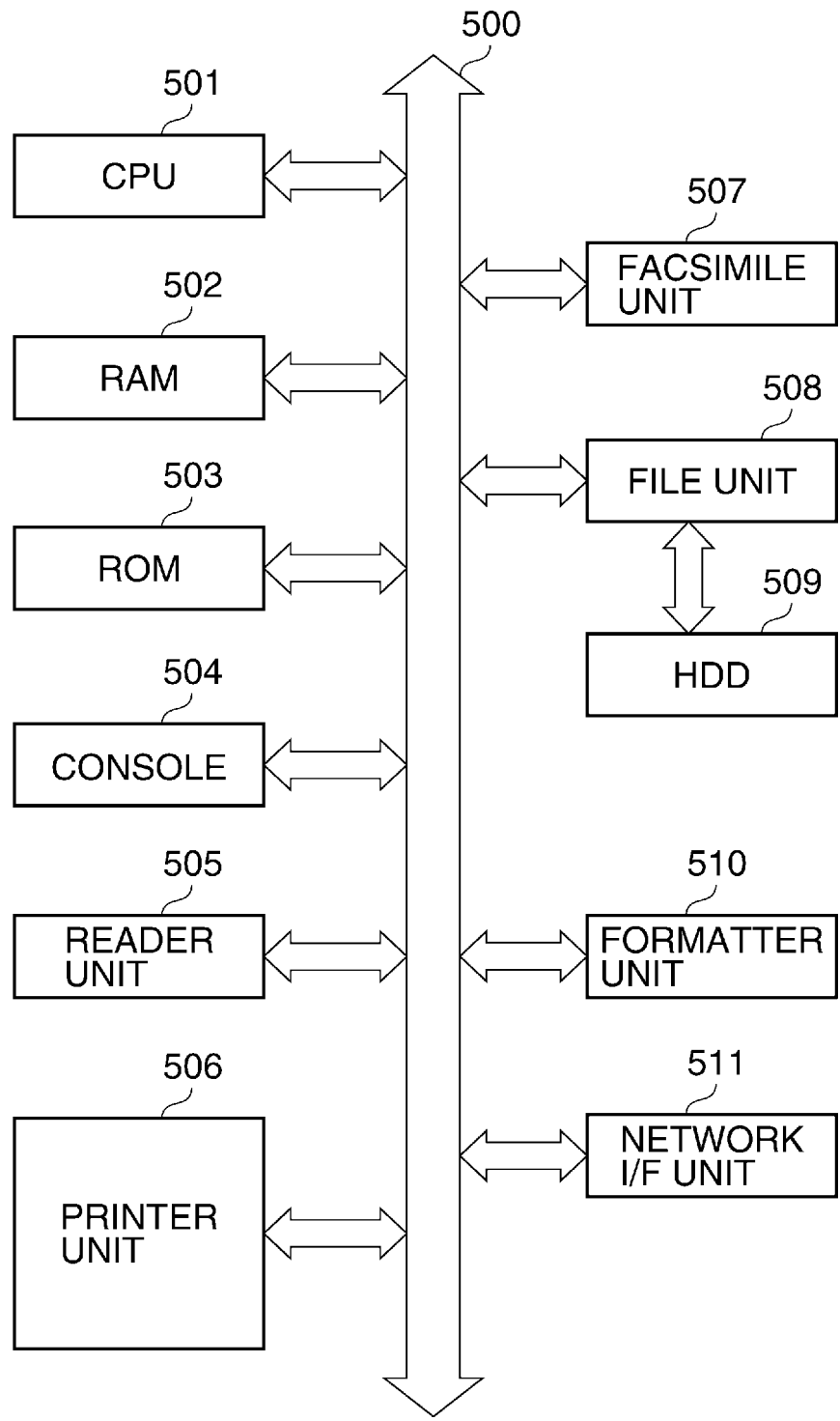
FIG. 3 is a view schematically showing a concrete exemplary arrangement of the image processing apparatus in FIG. 1.

FIG. 3 is a view schematically showing a concrete exemplary arrangement of the image processing apparatus 101 shown in FIG. 1.

Referring to FIG. 3, a reference numeral 501 designates a CPU that plays a pivotal role in computing and control of the image processing apparatus 101. The CPU 501 executes programs to manage the statuses of the component elements of the image processing apparatus 101, control the input and output of commands, and control the input and output of image data. A reference numeral 502 designates a RAM, which is a main memory for the CPU 501 and acts as an execution area and a data area for execution programs. A reference numeral 503 designates a ROM, which stores procedures of processing to be performed by the CPU 501. In the ROM 503, basic software (OS) as a system program for controlling the components of the image processing apparatus 101 and data such as information required for operating the system are stored.

A reference numeral 504 designates a console (operation panel) that gives print instructions to a reader unit 505, described later, and gives instructions regarding processing on component elements 506 to 511 electrically connected to the reader unit 505. The reference numeral 505 designates an image input device (reader unit) that converts an original into image data. The reader unit 505 photoelectrically reads (scans) an image on an original by a CCD linear image sensor or the like, and converts the read image into image data and outputs the same. A reference numeral 506 designates an image output device (printer unit) that outputs image data from the reader unit 505 as a visual image on a recording sheet according to a print instruction input from the console 504.

A reference numeral 507 designates a facsimile unit that controls a facsimile function. A reference numeral 508 designates a file unit that controls a file system function of managing files stored on an external storage device (HDD) 509. A reference numeral 510 designates a formatter unit that performs processing in which image data information is turned into a visual image. A reference numeral 511 designates a network I/F (interface) unit that is connected to the network 100 and carries out communication processing.

A reference numeral 500 designates transmission buses (address bus, data bus, input/output bus, and control bus) for connecting together the component elements from the CPU 501 to the network I/F unit 511 of the above described image processing apparatus 101.

The image processing apparatus 101 realizes functions such as copying, e-mail transmission, and data storage in a box using the component elements shown in FIG. 3. When the image processing apparatus 101 is to execute the above described functions, a screen for making various settings such as color/monochrome, printing magnification, and double-sided/one-sided printing is displayed on the console 504. A user can make necessary settings on a setting screen displayed on the console 504.

Figure 4:
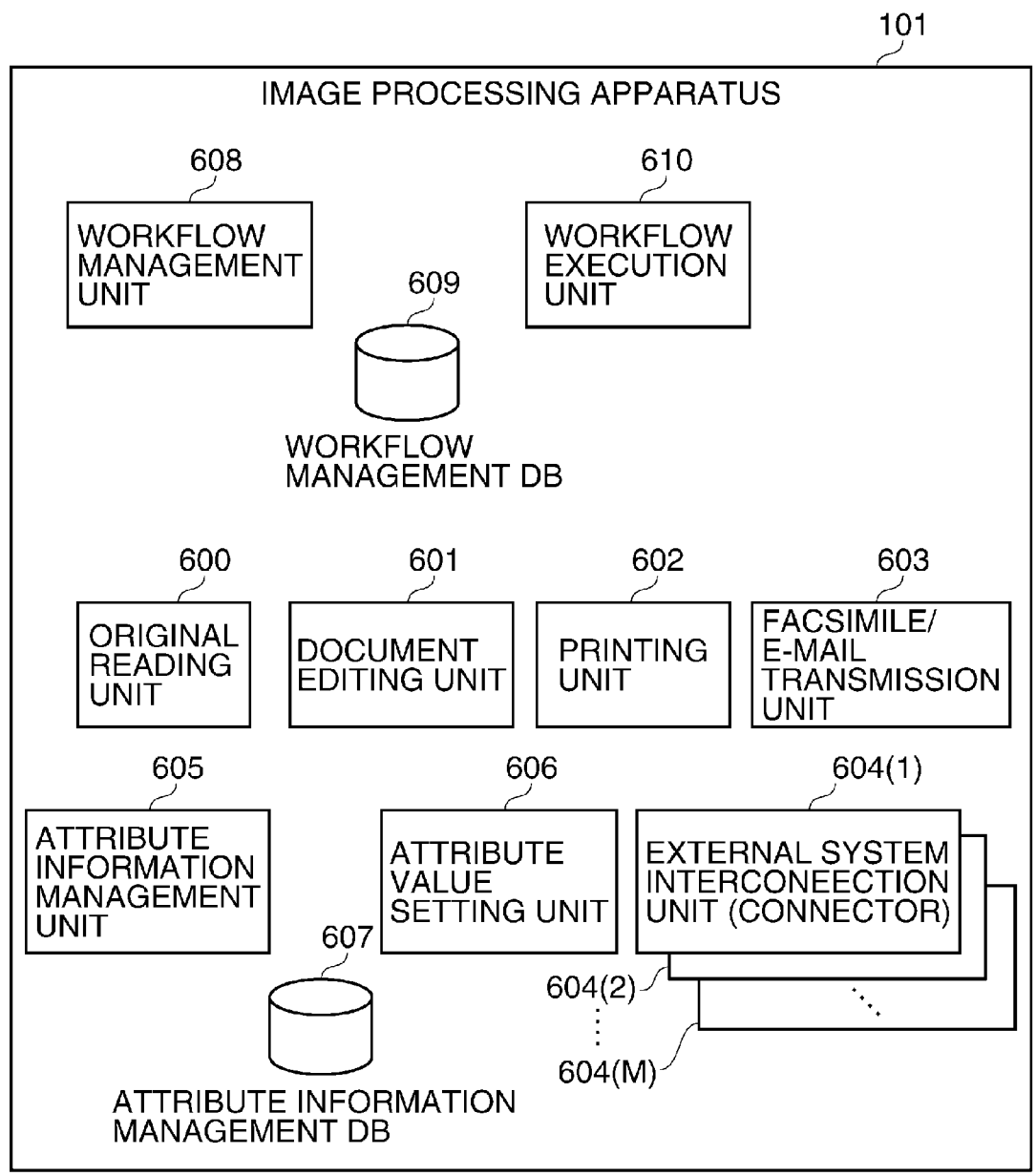
FIG. 4 is a view schematically showing a functional arrangement for realizing functions which the image processing apparatus has.

FIG. 4 is a view schematically showing a functional arrangement for realizing a plurality of functions which the image processing apparatus 101 has.

A group of illustrated units is comprised of programs processed by the image processing apparatus 101, and they are stored in the HDD 509 or the ROM 503 of the image processing apparatus 101. It should be noted that these programs are loaded onto the RAM 502 and executed by the CPU 501. A database shown in FIG. 4 is stored in the HDD 509 of the image processing apparatus 101.

A reference numeral 600 designates an original reading unit, which is executed by the CPU 501 in the image processing apparatus 101. The original reading unit 600 gives an instruction to the reader unit 505 via the transmission bus 500 and causes the reader unit 505 to convert a result obtained by scanning a paper document into electronic data. In the present embodiment, electronic data generated by a function of the image processing apparatus 101 is referred to as document data. Thus, document data includes image data generated by the image processing apparatus 101 scanning an original, and image data such as a received facsimile image which is handled in the image processing apparatus 101.

A reference numeral 601 designates a document editing unit, which is executed by the CPU 501 in the image processing apparatus 101. The document editing unit 601 edits document data obtained by the original reading unit 600 to delete pages and combine the document data with other document data. Also, the document editing unit 601 gives an instruction to the file unit 508 via the transmission bus 500 and causes the file unit 508 to store the document data in a data area of the above described HDD 509, which is called a box.

A reference numeral 602 designates a printing unit, which is executed by the CPU 501 in the image processing apparatus 101. The printing unit 602 gives an instruction to the printer unit 506 via the transmission bus 500 and causes the printer unit 506 to print document data obtained by the original reading unit 600 or document data edited by the document editing unit 601 as a paper document.

A reference numeral 603 designates a facsimile/e-mail transmission unit, which is executed by the CPU 501 in the image processing apparatus 101. The facsimile/e-mail transmission unit 603 transmits document data obtained by the original reading unit 600 and document data edited by the document editing unit 601 to a designated transmission destination. As means for communicating with the transmission destination by the facsimile/e-mail transmission unit 603, facsimile communication and e-mail transmission according to a communication protocol such as SMTP are envisaged.

A reference numerals 604(1), 604(2), . . . , 604(M) designate external system interconnection units (hereinafter referred to as the "connectors"), which are executed by the CPU 501 in the image processing apparatus 101. The connectors 604(1), 604(2), . . . , 604(M) transmit document data obtained/edited by the original reading unit 600 and the document editing unit 601 to the systems 102(1), 102(2), . . . , 102(M), respectively.

The connector 604(X) is a communication (image data transmission) unit that transmits document data to an arbitrary one system 102(X), and different units are prepared when document data is transmitted to the system 102(X) and when document data is transmitted to the system 102(Y). The reason why different units are prepared for different systems is that the system 102(X) and the system 102(Y) differ in communication protocol, communication procedure, and required parameters for transmitting and receiving document data. It should be noted that when document data with an attribute information file attached thereto is to be transmitted to the system 102(X), the connector 604(X) creates the attribute information file.

Figure 5:
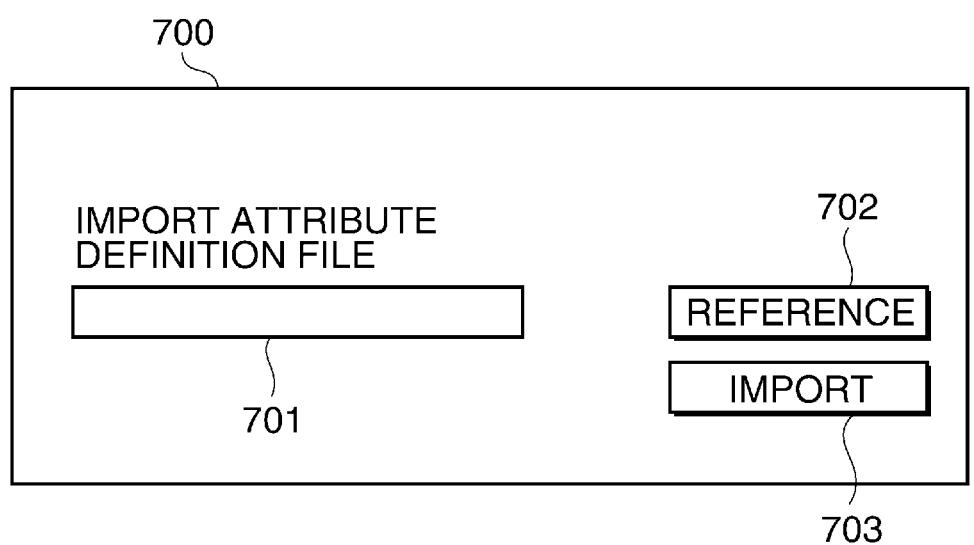
FIG. 5 is a view showing an exemplary user interface displayed on a Web browser operating on the information terminal.

A reference numeral 605 designates an attribute information management unit, which is executed by the CPU 501 in the image processing apparatus 101. The attribute information management unit 605 registers, in an attribute information management DB 607, items required as attributes for each connector that transmits document data to the system 102(X), and manages the registered items. It should be noted that in response to a request from a Web browser operating on the information terminal 103, the attribute information management unit 605 displays on the Web browser a user interface for registering attribute information as shown in FIG. 5, described later.

A reference numeral 606 designates an attribute value setting unit, which is executed by the CPU 501 in the image processing apparatus 101. The attribute value setting unit 606 obtains attribute information required for the connector 604(X) defined in a work item "Send" in a workflow from an attribute information management DB 607, described later, and sets attribute values for the obtained attributes. It should be noted that the attribute values set by the attribute information management unit 605 can be referred to by the connector 604(X). In setting attribute values, the attribute value setting unit 606 obtains data managed in a database system or a file server to which the attribute value setting unit 606 can be connected via the network 100. It should be noted that in the present embodiment, the attribute value setting unit 606 may be referred to as an index obtaining connector because the attribute value setting unit 606 accesses a database system or a file server to which the attribute value setting unit 606 can be connected via the network 100.

A reference numeral 607 designates an attribute information management database (the attribute information management DB), which manages items of attributes required for the connector 604(X), initial values and set values for the attributes, and so on.

A reference numeral 608 designates a workflow management unit, which is executed by the CPU 501 in the image processing apparatus 101. The workflow management unit 608 registers and manages a workflow in which the order in which a plurality of work items are executed and the contents of settings as to processing on the individual work items are set in advance. Here, the word "work item" means each of functions of the image processing apparatus 101 realized by the original reading unit 600, the document editing unit 601, the printing unit 602, and so on.

A reference numeral 609 designates a workflow management database (hereinafter abbreviated as the "workflow management DB"), which stores workflows defined by the workflow management unit 608. A reference numeral 610 designates a workflow execution unit, which reads out and executes a sequential workflow stored in the workflow management DB 609.

FIG. 5 is a view showing an exemplary user interface displayed on the Web browser operating on the information terminal 103 in response to a request from the Web browser. The user interface is for registering attribute information.

Referring to FIG. 5, a reference numeral 700 designates a screen displayed on the Web browser operating on the information terminal 103. A reference numeral 701 designates a file path input area for designating an attribute definition file, described later, which is to be transmitted from the information terminal 103 to the attribute information management unit 605. A reference numeral 702 designates a reference button. In response to a user pressing the reference button 702, the Web browser displays a dialogue for designating a file path. When the user selects a file using the displayed dialogue, the Web browser displays the selected file path in the file path input area 701. It should be noted that the user may directly type a file path to the file path input area 701.

A reference numeral 703 designates an import button. In response to the user pressing the import button 703, the Web browser transmits the file designated in the file path input area 701 to the attribute information management unit 605.

FIG. 6 is a view useful in explaining a data structure of the attribute information management DB 607.

Reference numeral 800 designates attribute IDs, which are identifiers of attribute items registered by the attribute information management unit 605. A reference numeral 801 designates connector names, which indicate the connectors 604 (X) requiring attribute items registered by the attribute information management unit 605. A reference numeral 802 designates attribute names, which indicate the names of attribute items registered by the attribute information management unit 605. A reference numeral 803 designates attribute initial values, which are initial values for attribute items registered by the attribute information management unit 605. A reference numeral 804 designates attribute set values, which are set values set by the attribute information setting unit 606.

A reference numeral 805 designates related attribute IDs, which are attribute IDs of attributes that separately exist as attributes but have the same meaning and use the same set value. For example, referring to FIG. 6, there are two attributes "Login ID" and "User ID". It is assumed that the attribute "Login ID" and the attribute "User ID" are attributes that may use the same set value. In such a case, the attribute IDs 800 are set as information for associating the attribute "Login ID" and the attribute "User ID" with each other in the related attribute IDs.

FIG. 7 is a view useful in explaining the contents of an attribute definition file transmitted to the attribute information management unit 605 from the Web browser of the information terminal 103 using the user interface shown in FIG. 5. In the following description of the present embodiment, it is assumed that an attribute definition file is described in XML syntax.

A reference numeral 900 designates an attribute definition file, which defines information which the user wants to register. A reference numeral 901 designates an index element, which indicates attribute information which the user wants to register in the attribute information management unit 605. A reference numeral 902 designates a name element, which indicates the name of an attribute item which the user wants to register. A reference numeral 903 designates a connector element, which indicates the name of the connector 604(X) requiring the attribute item designated by the name element 902. A reference numeral 904 designates an initial value element, which indicates an initial value for the attribute item designated by the name element 902. A reference numeral 905 designates a related index element, which indicates an attribute ID initial value of an attribute that separately exists as an attribute but has the same meaning and uses the same set value as the attribute item designated by the name element 902.

Figure 8:
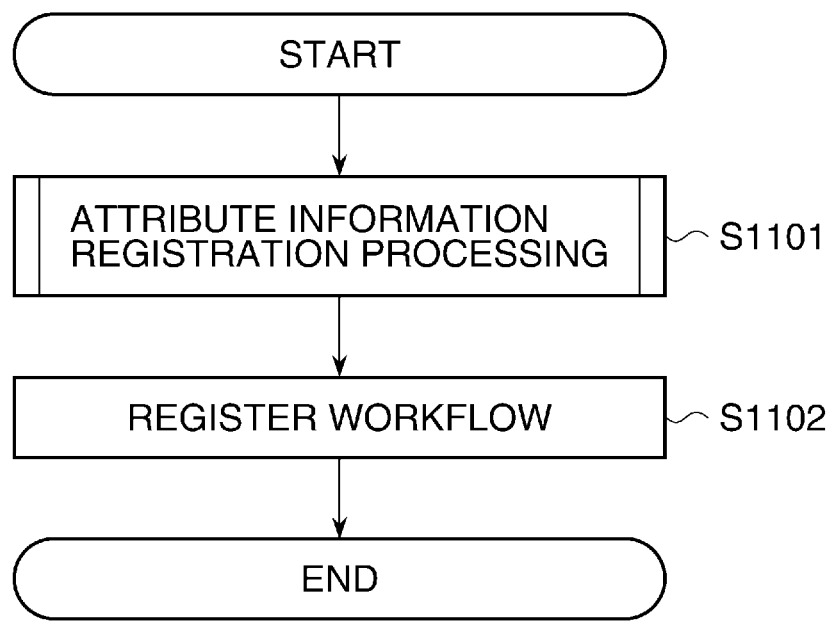
FIG. 8 is a flowchart showing procedures of processing for setting and management in the image processing apparatus.

FIG. 8 is a flowchart showing procedures of processing for setting and management in the image processing apparatus 101. The processing for setting and management is carried out as a preparation to execute a workflow.

In step S1101, the attribute information management unit 605 registers in the attribute information management DB 607 information (attribute information) related to attribute items required by the connector 604(X) through e.g. input from the user (attribute information registration processing).

In step S1102, the workflow management unit 608 registers a workflow in the workflow management DB 609. In general, a workflow is defined as one comprised of an input step of inputting document data to the image processing apparatus 101 such as reading of an original, an editing step of editing the inputted document data, and an output step of outputting the editing result such as printing of the document data, transmission of the document data by e-mail, or transmission of the document data to the system 102(X). The workflow management unit 608 adds the connector 604(X) identified by the attribute information registered in the step S1101 to the output step of the workflow defined by the user, and registers the workflow in the workflow management DB 609.

Figure 9:
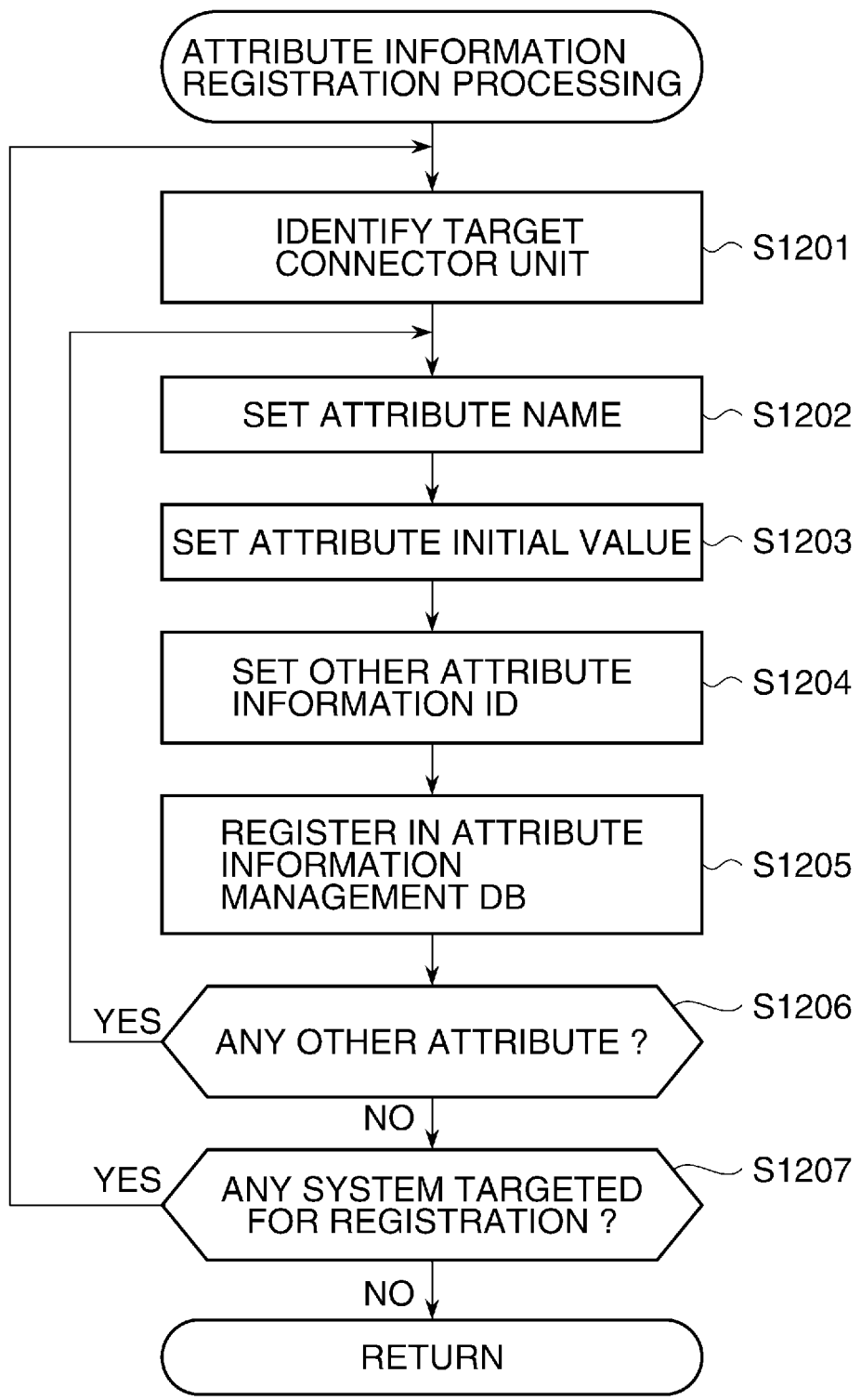
FIG. 9 is a flowchart showing procedures of an attribute information registration process in step S1101 in FIG. 8.

FIG. 9 is a flowchart showing procedures in detail the attribute information registration processing in the step S1101 in FIG. 8. In the step S1101, the process is started by the attribute information management unit 605 receiving the attribute definition file 900. The user accesses the attribute information management unit 605 from the Web browser operating on the information terminal 103 and transmitting the attribute definition file 900, and as a result, the attribute information management unit 605 receives the attribute definition file 900.

Referring to FIG. 9, in step S1201, the attribute information management unit 605 reads one index element 901 from the attribute definition file 900. Next, the attribute information management unit 605 determines a connector name by reading the connector element 903, which is a subelement of the read index element 901. As a result, the connector 604(X) for which an attribute is to be registered is identified.

In step S1202, the attribute information management unit 605 reads the name element 902, which is a subelement of the index element 901 read in the step S1021. Next, the attribute information management unit 605 accepts an attribute name written in the read name element 902 as the attribute name designated by the user.

In step S1203, the attribute information management unit 605 reads the initial value element 904, which is a subelement of the index element 901 read in the step S1201. Next, the attribute information management unit 605 accepts an initial value written in the read initial value element 902 as the initial value designated by the user.

In step S1204, the attribute information management unit 605 reads the related index ID element 905, which is a subelement of the index element 901 read in the step S1021. Next, the attribute information management unit 605 accepts a related attribute ID written in the read related index ID element 905 as the related attribute ID designated by the user.

It should be noted that in the steps S1201 through S1204, the contents written in the attribute definition file 900 are accepted as information on the attribute to be registered. However, the console 504 on the image processing apparatus 101 or the like may be provided with a screen for inputting the information on the attribute, and values inputted by the user may be accepted as information on the attribute to be registered.

In step S1205, the attribute information management unit 605 issues a unique identifier in the attribute information management DB 607 as an attribute ID, and registers the same in the attribute IDs 800 of the attribute information management DB 607. Next, the attribute information management unit 605 registers the connector name of the connector 604(X) identified in the step S1201 in the connector names 801 of the attribute information management DB 607. Next, the attribute information management unit 605 registers the attribute name accepted in the step S1202 in the attribute names 802 of the attribute information management DB 607. Next, the attribute information management unit 605 registers the attribute initial value accepted in the step S1203 in the attribute initial values 803 of the attribute information management DB 607. Next, the attribute information management unit 605 registers the related attribute ID accepted in the step S1204 in the related attribute IDs 805 of the attribute information management DB 607.

In step S1206, the attribute information management unit 605 determines whether or not there is any other attribute to be registered through input from the user. When there is any other attribute to be registered, the attribute information management unit 605 returns to the step S1202. On the other hand, when there is no other attribute to be registered, the attribute information management unit 605 proceeds to step S1207.

In the step S1207, the attribute information management unit 605 determines whether or not there is any other connector 604(X) whose attribute is to be registered through input from the user. When there is any other connector 604(X) to be registered, the attribute information management unit 605 returns to the step S1201. On the other hand, when there is no other attribute to be registered, the attribute information management unit 605 terminates the attribute information registration processing and returns.

Figure 10:
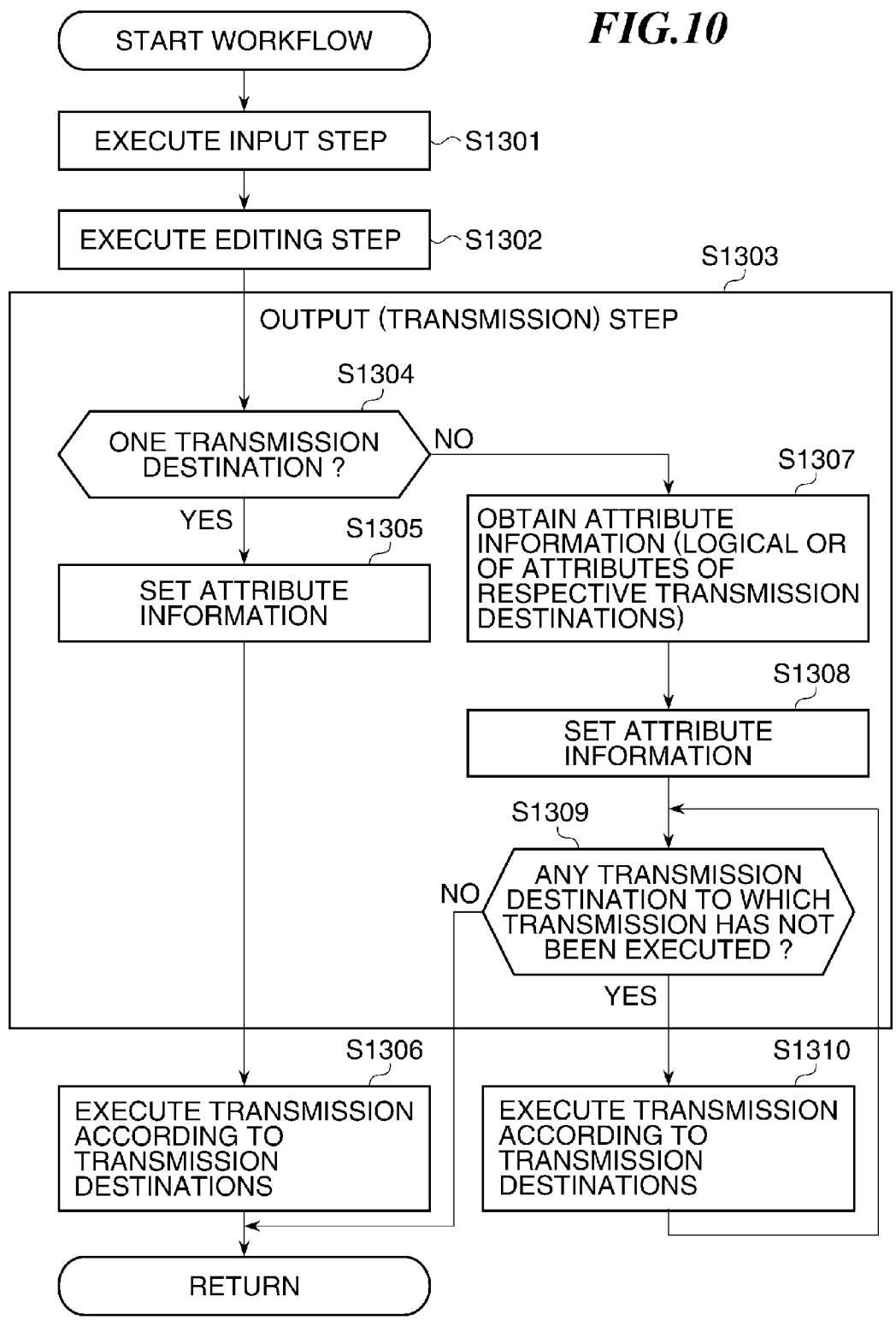
FIG. 10 is a flowchart showing procedures of processing in the image processing apparatus when a workflow registered in step S1102 in FIG. 8 is executed.

FIG. 10 is a flowchart showing procedures of processing in the image processing apparatus 101 when the workflow registered in the step S1102 in FIG. 8 is executed.

In step S1301, in response to a user's operation such as a depression of a workflow execution button, the workflow execution unit 610 starts a workflow designated by the user, and executes a work item defined in an input step of the started workflow. For example, when a work item "Scan" is to be executed, the following processing is performed. The workflow execution unit 610 calls the original reading unit 600. In calling the original reading unit 600, the workflow execution unit 610 transmits a set value for the work item "Scan" defined in the started workflow to the original reading unit 600. The original reading unit 600 called by the workflow execution unit 610 executes original reading processing according to the set value transmitted from the workflow execution unit 610.

In step S1302, the workflow execution unit 610 executes a work item defined in an editing step of the workflow started in the step S1301. For example, when a work item "Edit Document (Delete Page)" is to be executed, the following processing is performed. The workflow execution unit 610 calls the document editing unit 601. In calling the document editing unit 601, the workflow execution unit 610 transmits a set value for the work item "Edit Document (Delete Page)" defined in the started workflow to the document editing unit 600. The document editing unit 601 called by the workflow execution unit 610 executes document editing processing according to the set value transmitted from the workflow execution unit 610.

In step S1303, the workflow execution unit 610 executes a work item defined in an output step in the started workflow. In the description of the present embodiment, it is assumed that the work item "Send" is executed in the output step, and the connector 604(X) is defined in the work item "Send". It should be noted that in the step S1302, another work item such as "Print" may be defined in the workflow. In a case where another work item such as "Print" is defined in the workflow, the workflow execution unit 610 calls the printing unit 602 or the like according to the definition as in the step S1302.

In step S1304, the workflow execution unit 610 executes the work item "Send" defined in the output step in the started workflow. At this time, the workflow execution unit 610 determines whether or not a plurality of connectors 604(X) are defined in the defined work item "Send". When a plurality of connectors 604(X) are defined, the workflow execution unit 610 proceeds to step S1307. On the other hand, when only one connector 604(X) is defined, the workflow execution unit 610 proceeds to step S1305.

In the step S1305, the workflow execution unit 610 calls the attribute value setting unit 606. The attribute value setting unit 606 called by the workflow execution unit 610 refers to the attribute information management DB 607 to obtain attribute information required for the connector 604(X) defined in the workflow, and displays a GUI such as an attribute setting screen 1001 shown in FIG. 11 on the console 504. As input items of the GUI such as the attribute setting screen 1001 displayed here, attributes required for the connector 604(X) are displayed. Values inputted from the GUI by the user are registered as attribute values in the attribute set values 804 of the attribute information management DB 607.

It should be noted that in the step S1305, the attribute value setting unit 606 may display the attribute initial values 803 of the attribute information management DB 607 as input initial values for input items of the displayed GUI. Moreover, the attribute value setting unit 606 may obtain data managed in a data file on a database system or a file server, and display the data as input initial values for input items of the displayed GUI. In the present embodiment, a case where a data file on a file server using SMB protocol on the network is referred to will be described with reference to FIG. 12.

In step S1306, the workflow execution unit 610 calls the connector 604(X) defined in the work item "Send" in the output step of the workflow started in the step S1301. The connector 604(X) called by the workflow execution unit 610 refers to the attribute information management DB 607 and obtains attribute values for the required attributes. Then, the connector 604(X) creates an attribute information file from the obtained attribute values, and transmits the file as well as the document data generated in the step S1302 to the system 102(X).

It should be noted that although in the step S1306, the connector 604(X) creates the attribute information file from the obtained attribute values, the obtained attribute values may be used for another purpose. For example, the connector 604(X) may transmit the obtained attribute values as values corresponding to parameters for communication with the system 102(X) to the system 102(X).

In step S1307, the workflow execution unit 610 calls the attribute value setting unit 606. It is assumed here that in the work item "Send" defined in the output step of the workflow, the connectors 604(1), 604(2), ..., 604(M) are defined. The attribute value setting unit 606 called by the workflow execution unit 610 refers to the attribute information management DB 607 and obtains attribute values required for the connectors 604(1), 604(2), ..., 604(M) defined in the workflow. At this time, when there are related attributes in related attribute IDs 805 of the attribute information management DB 607 referred to, only one is selected from the related attributes. Thus, only one of duplicate attributes is obtained from attribute information required for the connectors 604(1), 604(2), ..., 604(M).

In step S1308, the attribute value setting unit 606 displays a GUI such as the attribute setting screen 1001 shown in FIG. 11 on the console 504. As input items of the GUI such as the attribute setting screen 1001 displayed here, the attributes obtained from the attribute information management DB 607 are displayed. The attribute value setting unit 606 registers values inputted from the GUI by the user as attribute values in the attribute set values 804 of the attribute information management DB 607. Further, the attribute value setting unit 606 refers to the related attribute IDs 805 of the attribute information management DB 607, and registers the same attribute values in the attribute set values 804 of attributes related to the attributes for which the attribute set values 804 have been registered.

It should be noted that in the step S1308, the attribute value setting unit 606 may display the attribute initial values 803 of the attribute information management DB 607 as input initial values for input items of the displayed GUI as in the step S1305. Also, the attribute value setting unit 606 may obtain and display data managed in a data file on a database system or a file server as input initial values for input items of the displayed GUI. In the present embodiment, a case where a data file on a file server is referred to using SMB protocol on a network will be described with reference to FIG. 12.

In step S1309, the workflow execution unit 610 determines whether or not there are any connectors that have not been called among the connectors 604(1), 604(2), . . . , 604(M). When there are any connectors that have not been called, the workflow execution unit 610 proceeds to step S1310. On the other hand, when there are no connectors that have not been called, the workflow execution unit 610 terminates the present processing.

In the step S1310, the workflow execution unit 610 calls one arbitrary connector 604(X) among the "uncalled connectors" determined in the step S1309. The connector 604(X) called by the workflow execution unit 610 refers to the attribute information management DB 607 and obtains attribute values for the required attributes. Next, the connector 604(X) creates an attribute information file from the obtained attribute values, and transmits the file as well as the document data generated in the step S1302 to the system 102(X).

It should be noted that although in the step S1310, the connector 604(X) creates the attribute information file from the obtained attribute values, the obtained attribute values may be used for another purpose. For example, the connector 604(X) may transmit the obtained attribute values as values corresponding to parameters for communication with the system 102(X) to the system 102(X).

Figure 12:
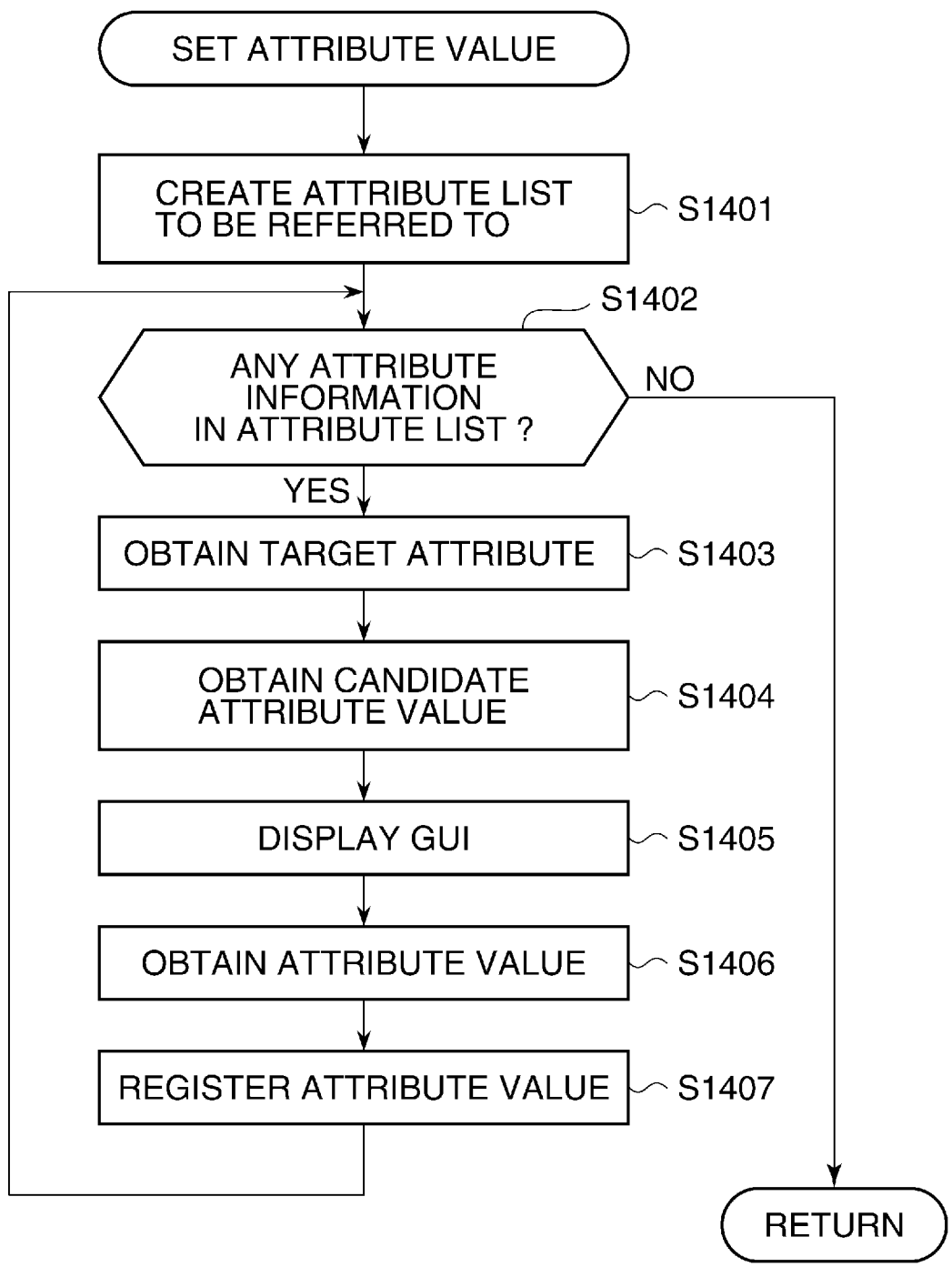
FIG. 12 is a flowchart showing in detail how attribute information is set in step S1305 and step S1308 in FIG. 10.
Figure 13:
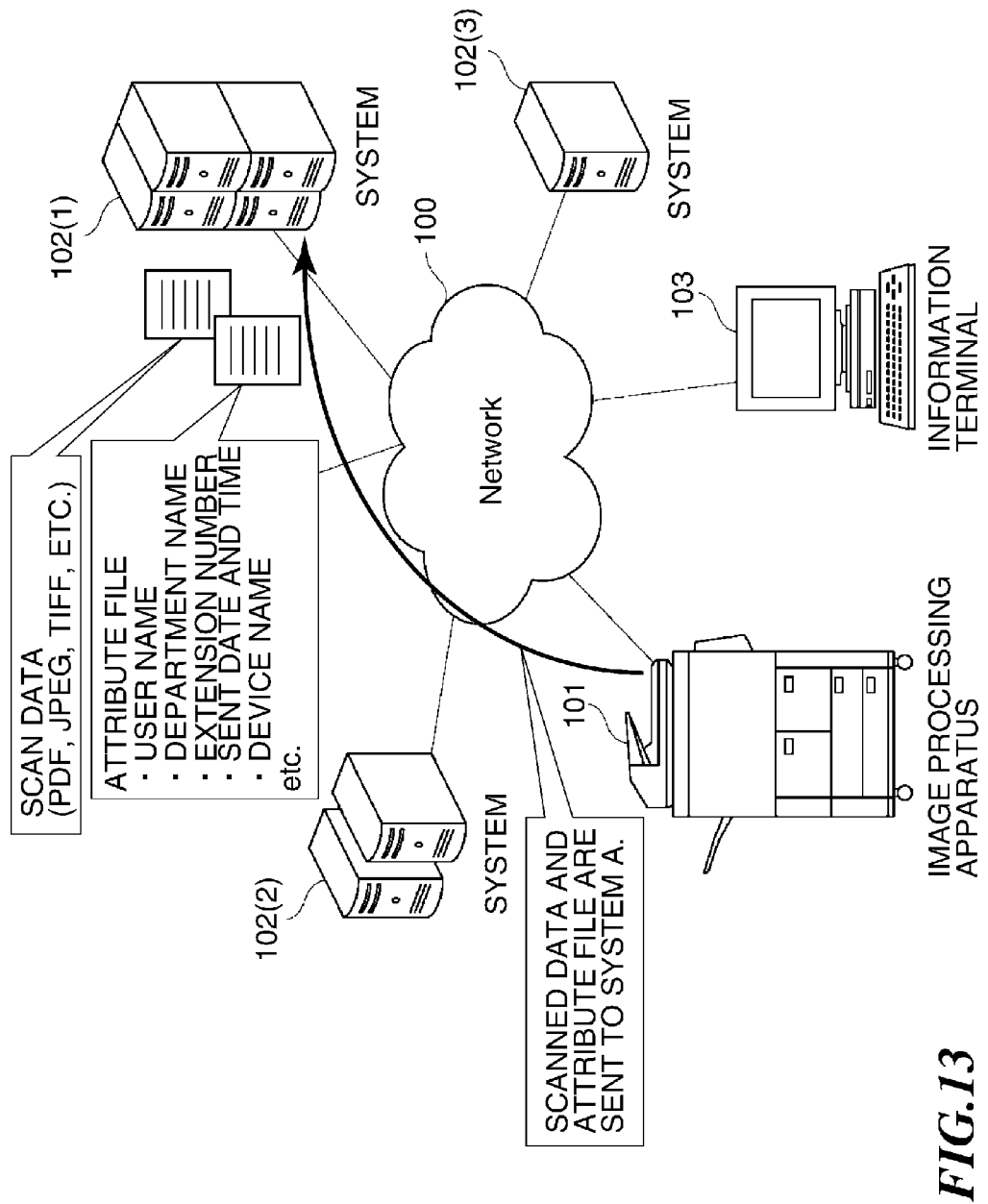
FIG. 13 is a view showing how an attribute information file as well as document data generated through scanning by the image processing apparatus is transmitted to a system.
Figure 14:
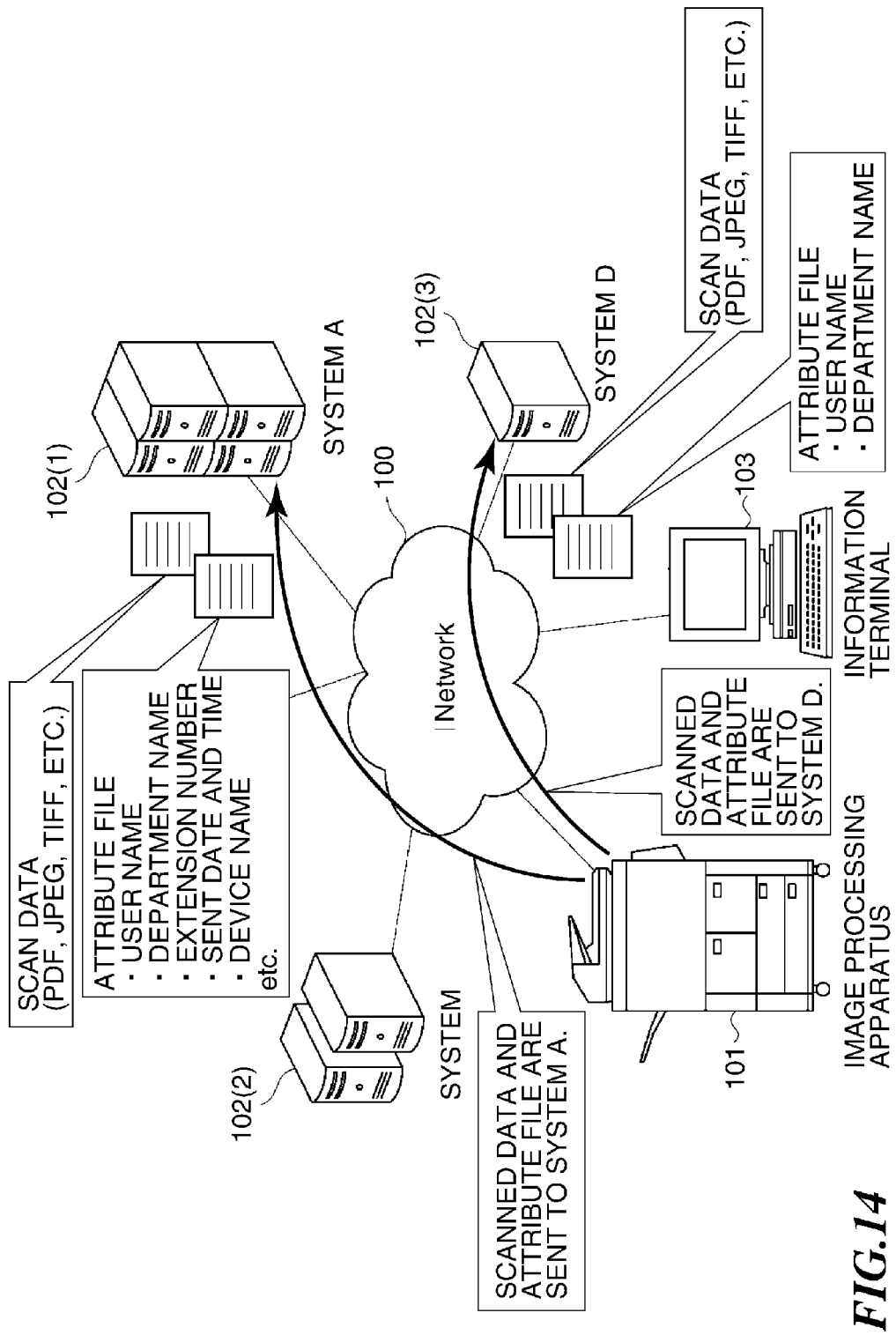
FIG. 14 is a view showing how attribute information files as well as document data generated through scanning by the image processing apparatus are transmitted to two different systems.

FIG. 12 is a flowchart showing procedures in detail how attribute information is set in the steps S1305 and S1308 in FIG. 10. The present processing is particularly a processing that is carried out in a case where, to obtain input initial values for input items of the displayed GUI, a data file on a file server using SMB protocol on the network is referred to.

Here, it is assumed that attribute names and candidate attribute values are stored in the data file on the file server using SMB protocol on the network. Also, because the attribute value setting unit 606 accesses the file server on the network, the attribute value setting unit 606 will hereinafter be referred to as the index obtaining connector 606.

In step S1401, the index obtaining connector 606 obtains necessary attribute information from the attribute information management DB 607, and then creates a list of the obtained plurality of pieces of attribute information as an attribute list.

In step S1402, the index obtaining connector 606 ascertains whether or not there is attribute information in the attribute list. When there is attribute information in the attribute list, the index obtaining connector 606 proceeds to step S1403. On the other hand, when there is no attribute information in the attribute list, the index obtaining connector 606 terminates the present process and returns.

In the step S1403, the index obtaining connector 606 obtains one arbitrary piece of attribute information from the attribute list, and deletes the obtained attribute information from the attribute list.

In step S1404, the index obtaining connector 606 refers to the data file on the file server using SMB protocol on the network, and obtains candidate attribute values for required attributes.

In step S1405, the index obtaining connector 606 displays a GUI such as the attribute setting screen 1001 on the console 504 in which the candidate attribute values obtained in the step S1404 are displayed as input initial values or choices for the attributes.

In step S1406, the index obtaining connector 606 obtains user input values on the displayed GUI such as the attribute setting screen 1001.

In step S1407, the index obtaining connector 606 registers the user input values obtained in the step S1406 as attribute values in the attribute set values 804 of the attribute information management DB 607.

In the above described manner, the image processing apparatus 101 refers to a data file on a file server using SMB protocol on the network and obtains attribute values.

The index obtaining connector 606 may refer to data managed in a database system, not a data file on a file server. In a case where data managed in a database system is referred to, the index obtaining connector 606 obtains necessary attribute information from the attribute information management DB 607, and then performs the following processing. Here, it is assumed that a table having columns of attribute values and candidate attribute values is defined in the database system. The index obtaining connector 606 issues a query to the database system, and obtains candidate attribute values for required attributes.

In the above described manner, attribute information files in which different pieces of attribute information are written can be transmitted to a plurality of different systems in one workflow.

Further, because duplicate attributes among attributes required for the connectors 604(X) are managed in association with each other, and set values therefor are set at once, the situation that the same attribute values are repeatedly set can be avoided. Moreover, only necessary attributes are set at the time of execution of a workflow. For this reason, settings can be made only for the minimum number of attributes required among different pieces of attribute information on a plurality of different systems, and hence the input load or the like on the user can be reduced.

According to the above described embodiment, there is provided the attribute information management unit 605 that manages attributes required by a plurality of external systems when document data is transmitted to the plurality of external systems. At the time of execution of a workflow, the attribute value setting unit 606 sets attribute values for the attributes required by the external systems, and the connector 604(M) refers to the set attribute values and transmits the document data to an arbitrary external system. Thus, attribute information files including different pieces of attribute information can be transmitted to respective ones of a plurality of different systems in one workflow. As a result, the work load on the user can be reduced as described below. Without the need to define workflows corresponding in number to the number of systems as transmission destinations, the user can combine them into one workflow. Because a plurality of workflows can be combined into one workflow, the user does not have to execute the plurality of workflows one by one. The use has only to execute one workflow.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-295465 filed Nov. 19, 2008, which is hereby incorporated by reference herein in its entirety.

What is claimed is:

1. An image processing apparatus comprising:
an image input unit adapted to input image data;
a communication unit adapted to transit the image data to at least one external system;
an attribute information management unit adapted to manage attributes that are required by the external system when the communication unit transmits the image data to the at least one external system, wherein the attributes are comprised of pieces of attribute information related to attribute values of the image data;
a workflow execution unit adapted to execute a workflow as a sequential processing in which a plurality of functions of the image processing apparatus are combined, said workflow execution unit further adapted to output image data;
an attribute value setting unit adapted to set attribute values for the attributes required by the external system; and
an external system interconnection unit adapted to cause the communication unit to transmit the image data output from said workflow execution unit to the external system and the attribute values set by said attribute value setting unit,
wherein:
said attribute value setting unit sets the attribute value when the image data output from said workflow execution unit is transmitted to the external system;
the image processing apparatus causes the communication unit to transmit the image data to a plurality of external systems;
said attribute information management unit manages attributes required by the plurality of external systems, respectively; and
said attribute value setting unit sets, when the image data is transmitted to the plurality of external systems, necessary attributes except for duplicate attributes among all the attributes required by said plurality of external systems to which the image data is transmitted.

2. An image processing apparatus according to claim 1, wherein said external system interconnection unit creates an attribute information file with reference to the attribute values set by said attribute value setting unit, and transmits the attribute information file as well as the image data.

3. An image processing apparatus according to claim 1, wherein the attribute values setting unit acquires candidate attribute information for attributes required by the external system.

4. An image data transmission method for an image processing apparatus, the method comprising:
an image input step of inputting image data;
a communication step of transmitting the image data inputted by the image input step to at least one external system;
an attribute information management step of managing attributes that are required by the external system when the communication step transmits the image data to the at least one external system, wherein the attributes are comprised of pieces of attribute information related to attribute values of the image data;
a workflow execution step of executing a workflow as a sequential processing in which a plurality of functions of the image processing apparatus are combined, said workflow execution step outputting image data;
an attribute value setting step of setting attribute values for the attributes required by the external system; and
an external system interconnection step of causing the communication step to transmit image data output by the workflow execution step to the plurality of external system and the attribute values set in said attribute value setting step,
wherein:
said attribute value setting step sets the attribute value when the image data output from said workflow execution step is transmitted to the external system;
said communication step to transmits the image data to a plurality of external systems;
said attribute information management step manages attributes required by the plurality of external systems, respectively; and
said attribute value setting step sets, when the image data is transmitted to the plurality of external systems, necessary attributes except for duplicate attributes among all the attributes required by said plurality of external systems to which the image data is transmitted.

5. An image data transmission method according to claim 4, wherein the attribute values setting step comprises acquiring candidate attribute information for attributes required by the external system.

6. A non-transitory computer-readable storage medium storing a program that, when executed by a computer, causes the computer to perform an image data transmission method for an image processing apparatus, the method comprising:
an image input step of inputting image data;
a communication step of transmitting the image data inputted by the image input step to at least one external system;
an attribute information management step of managing attributes that are required by the external system when the communication step transmits the image data to the at least one external system, wherein the attributes are comprised of pieces of attribute information related to attribute values of the image data;
a workflow execution step of executing a workflow as a sequential processing in which a plurality of functions of the image processing apparatus are combined, said workflow execution step outputting image data;
an attribute value setting step of setting attribute values for the attributes required by the external system; and an external system interconnection step of causing the communication step to transmit image data output by the workflow execution step to the plurality of external system and the attribute values set in said attribute value setting step, wherein:

said attribute value setting step sets the attribute value when the image data output from said workflow execution step is transmitted to the external system;

said communication step to transmits the image data to a plurality of external systems;

said attribute information management step manages attributes required by the plurality of external systems, respectively; and said attribute value setting step sets, when the image data is transmitted to the plurality of external systems, necessary attributes except for duplicate attributes among all the attributes required by said plurality of external systems to which the image data is transmitted.

7. A non-transitory computer-readable storage medium according to claim 6, wherein the attribute values setting step comprises acquiring candidate attribute information for attributes required by the external system.

* * * * *